United States Patent [19]
Fukushima

[11] Patent Number: 6,006,882
[45] Date of Patent: Dec. 28, 1999

[54] DYNAMIC DAMPER AND FLYWHEEL ASSEMBLY

[75] Inventor: Hirotaka Fukushima, Hirakata, Japan

[73] Assignee: Exedy Corporation, Osaka, Japan

[21] Appl. No.: 09/109,373

[22] Filed: Jul. 2, 1998

[30] Foreign Application Priority Data

Jul. 11, 1997 [JP] Japan .................................. 9-186757

[51] Int. Cl.$^6$ .................................................. F16F 15/30
[52] U.S. Cl. ........................ 192/48.5; 74/574; 192/30 V; 192/209
[58] Field of Search ................................ 192/30 V, 48.5, 192/53.36, 55.6, 55.61, 209, 210, 210.1, 211; 464/83; 74/574; 267/293

[56] References Cited

U.S. PATENT DOCUMENTS

| | | | |
|---|---|---|---|
| 1,723,886 | 8/1929 | Pfaff ...................................... | 464/83 X |
| 1,828,508 | 10/1931 | Murray .................................. | 192/53.36 |
| 2,958,526 | 11/1960 | Ulderup et al. ...................... | 267/293 X |
| 3,209,875 | 10/1965 | Altmann ................................ | 192/66 |
| 4,157,227 | 6/1979 | Hahle .................................. | 267/293 X |
| 4,828,090 | 5/1989 | Matsushita ........................... | 192/84 |
| 4,842,116 | 6/1989 | Fukushima ........................ | 192/30 V X |
| 4,844,224 | 7/1989 | Fukushima ........................ | 192/30 V X |
| 4,846,323 | 7/1989 | Fukushima ............................. | 192/30 |
| 5,135,089 | 8/1992 | Kovac .............................. | 192/30 V X |
| 5,152,510 | 10/1992 | Komabashiri ........................ | 267/293 X |
| 5,168,971 | 12/1992 | Kovac .................................. | 192/30 V |
| 5,190,269 | 3/1993 | Ikeda et al. ........................... | 267/293 X |
| 5,253,740 | 10/1993 | Kohno et al. ......................... | 192/70.16 |
| 5,499,703 | 3/1996 | Kii et al. .............................. | 192/70.11 |
| 5,511,446 | 4/1996 | Kajitani et al. ....................... | 74/573 F |
| 5,669,820 | 9/1997 | Fukushima .............................. | 464/98 |
| 5,692,591 | 12/1997 | Kimura ............................... | 192/209 X |
| 5,797,297 | 8/1998 | Mokdad .................................... | 74/574 |

*Primary Examiner*—Rodney H. Bonck
*Attorney, Agent, or Firm*—Shinjyu Global IP Counselors, LLP

[57] ABSTRACT

A dynamic damper 10 employs rubber members in a manner to reduce stresses being applied to the rubber members and portions around the same without sacrificing a cost and damper characteristics. The dynamic damper 10 can operate in a coupling mechanism 1, which is provided for coupling a crankshaft 8 of an engine and an input shaft 9 of a transmission, to perform an operation interlocked with the input shaft 9 of the transmission, and includes a mass member 11, a sub-clutch 13 and an elastic portion assembly 12. The mass member 11 can rotate with the input shaft 9. The sub-clutch 13 releases an interlocked relationship between the input shaft 9 and the mass member 11 when a main clutch disengages the crankshaft 8 and the input shaft 9 from each other. The elastic portion assembly 12 includes a plurality of rubber members arranged in the circumferential direction, and elastically couples the input shaft 9 and the mass member 11 together in the rotating direction primarily by bending or compressing the rubber members when the input shaft 9 is interlocked with the mass member 11.

15 Claims, 10 Drawing Sheets

DYNAMIC DAMPER AND FLYWHEEL ASSEMBLY

BACKGROUND OF THE INVENTION

1. Field of the Invention

This invention generally relates a dynamic damper and a flywheel assembly. More specifically, the present invention relates to a dynamic damper, which operates in accordance with an operation of an input shaft of a transmission for dampening a vibration.

2. Background Information

In connection with such a dynamic damper and a flywheel assembly, the assignee has already developed prior arts disclosed in Japanese Laid-Open Patent Publication No. 6-48031 (1994) and others.

In the above prior arts, a second flywheel forming a mass portion is coupled to a drive and transmission system through a torsional damper mechanism to dampen a torsional vibration on the drive and transmission system only when a clutch disk is pressed against a first flywheel. Thereby, an operation impeding shifting of the transmission is suppressed in a disengaged state of a clutch while suppressing gear noises (neutral noises) of the transmission in a neutral state as well as vibrations and noises of the transmission during driving of a vehicle.

As one of employable structure for improving dampening characteristics, the dynamic damper may use rubber members in place of coil springs, which have been employed in torsional dampers. For example, as shown in FIG. 13, a second flywheel 71 may be coupled to an input shaft 9 of a transmission in a drive and transmission system through an annular rubber member 72.

Figure 13:
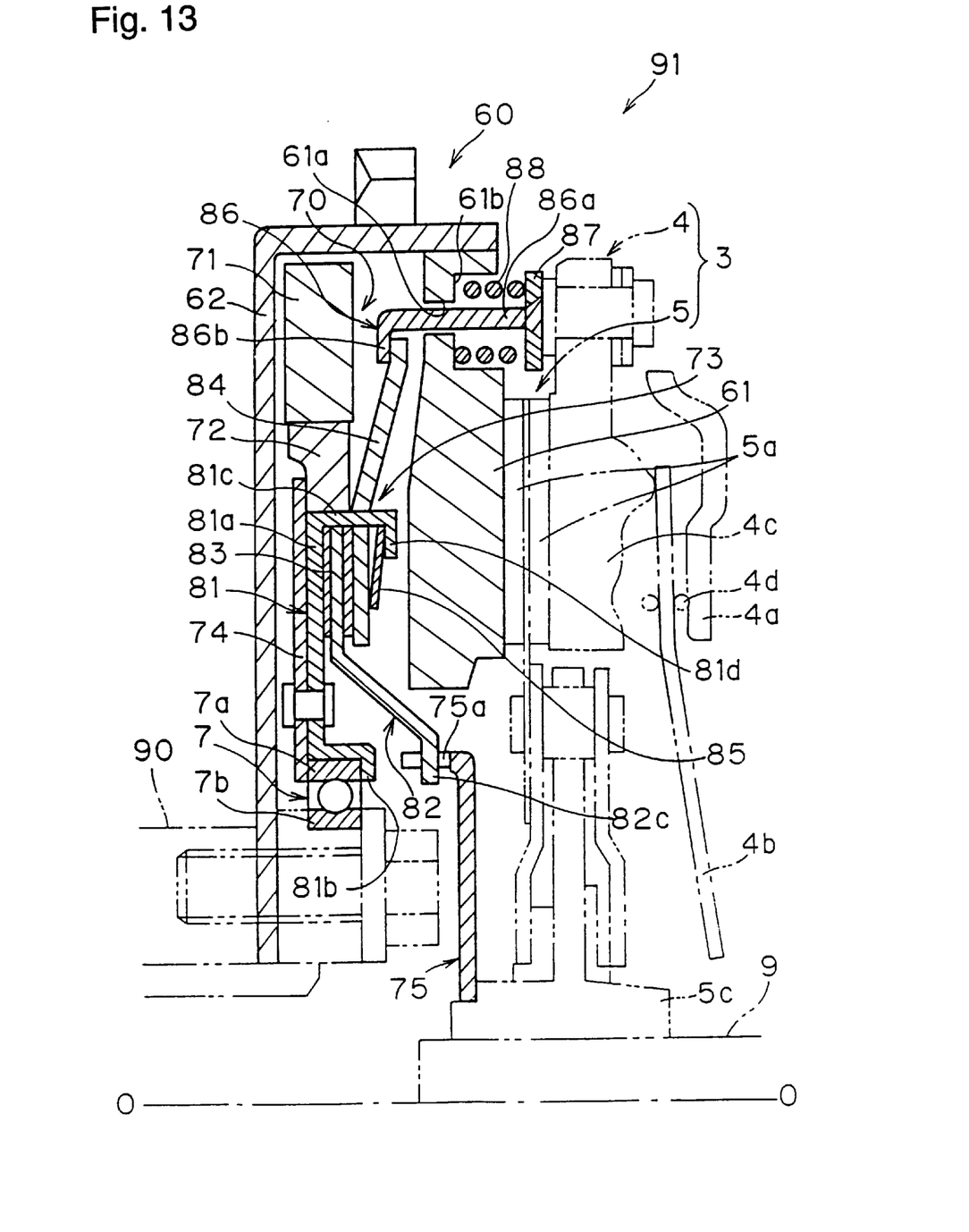
FIG. 13 is a partial cross-sectional view of a flywheel assembly with a dynamic damper employed in a coupling mechanism in accordance with a second embodiment of the present invention.

In the structure including the annular rubber member 72 as shown in FIG. 13, the rubber member 72 operating between the second flywheel 71 and the input shaft 9 of the transmission is primarily subjected to a shearing force, and therefore shearing deform occurs therein. Therefore, joined portions of the rubber member 72 and the second flywheel 71 may be separated from each other and/or the rubber member 72 may be deteriorated due to the shearing stress. For avoiding these disadvantages, it is necessary to reinforce the above portions and/or increase the rigidity thereof, resulting in increase in cost. If the rigidity of the rubber member is increased, then the intended dampening characteristics may not be obtained.

In view of the above, there exists a need for a dynamic damper and a flywheel assembly which overcomes the above-mentioned problems in the prior art. This invention addresses these needs in the prior art as well as other needs, which will become apparent to those skilled in the art from this disclosure.

SUMMARY OF THE INVENTION

An object of the present invention is to provide a dynamic damper, which can employ rubber members and can reduce a stress applied to the rubber members and portions around the same without sacrificing the cost and the damper characteristics.

According to a first aspect of the present invention, a dynamic damper is operable in a coupling mechanism to perform an operation interlocked with an input shaft of a transmission and includes a mass portion, a sub-clutch and elastic portions. The coupling mechanism is provided for coupling a crankshaft of an engine and the input shaft of the transmission, and includes a main clutch. The mass portion is operable in accordance with rotation of the input shaft of the transmission. The sub-clutch releases an interlocked relationship between the input shaft of the transmission and the mass portion when the main clutch releases the coupling between the crankshaft of the engine and the input shaft of the transmission. The elastic portions are arranged in a circumferential direction and include rubber members, respectively. The elastic portions elastically couple the input shaft of the transmission and the mass portion in the rotating direction primarily by bending or compressing the rubber members when the input shaft of the transmission and the mass portion are interlocked together by the sub-clutch.

In this coupling mechanism provided with the dynamic damper, a torque supplied from the crankshaft of the engine is transmitted to the input shaft of the transmission through the main clutch. When the main clutch is in the engaged position, the sub-clutch attains the interlocked state in which the dynamic damper operates in accordance with the rotation of the input shaft of the transmission. Therefore, the dynamic damper damps noises during the neutral state of the transmission and noises during driving. The above structure does not employ an inertia damper, which avoids a resonance by mere addition of an inertia, but employs the dynamic damper. Therefore, it is possible to dampen the vibration of the input shaft of the transmission in a partial rotation range. Consequently, the vibration can be reduced to a level, which cannot be attained by the internal damper.

In the structure of the above aspect of the present invention, the elastic portions couple the input shaft of the transmission and the mass portion together. Therefore, a member on the transmission input shaft side and a member on the mass portion side can be arranged at circumferentially opposite sides of the elastic portion, and the force is transmitted from the input shaft of the transmission to the mass portion through the rubber member which is primarily compressed and bent without being subjected to a shearing force.

In the dynamic damper of the above aspect of the present invention, as described above, shearing deformation of the rubber member is suppressed, and bending or compressing deformation, of which allowed range is larger than that of the shearing deformation, primarily occurs in the rubber member. Compared with the structure in which the input shaft of the transmission and the mass portion are coupled through the rubber member subjected primarily to a shearing force, therefore, it is possible to reduce a stress applied to the rubber members and portions around the same without improving the quality of material of the rubber members and without increasing the rigidity of the rubber members (and thus without sacrificing a dampening performance).

According to a second aspect of the present invention, the dynamic damper of the first aspect of the present invention further has such a feature that the rubber members are cylindrical. Each of the elastic portions has the rubber member, a radially inner cylindrical member and a radially outer cylindrical member. The radially inner cylindrical member is attached to the inner peripheral surface of the rubber member, and the radially outer cylindrical member is attached to the outer peripheral surface of the rubber member.

One of the radially inner cylindrical member and the radially outer cylindrical member is coupled to the input shaft of the transmission, and the other is coupled to the mass portion so that the input shaft of the transmission and the mass portion are elastically coupled together.

In this aspect of the present invention, the rubber member between the radially inner and outer cylindrical members is cylindrical, and receives a force through its inner and outer peripheral surfaces from the radially inner and outer cylindrical members, respectively. Thus, the rubber member has the cylindrical form and receives the force in the radial direction so that concentration of the stress in the rubber member can be suppressed. Further, the force is applied to the cylindrical rubber member so that the rubber member is primarily subjected to a compressing force. If the rubber member is provided with a cavity or the like, it is primarily subjected to a bending force.

According to a third aspect of the present invention, a flywheel assembly includes a flywheel and a dynamic damper. The flywheel is non-rotatably coupled to a crankshaft of an engine. The flywheel is disengageably coupled to a clutch disk assembly coupled to an input shaft of a transmission. The dynamic damper is the same as that according to the first or second aspect. In this aspect of the present invention, the dynamic damper is incorporated together with the flywheel in the flywheel assembly. This facilitates an assembly operation for attaching the flywheel assembly to the crankshaft of the engine, the clutch disk assembly or the input shaft of the transmission.

According to a fourth aspect of the present invention, the flywheel assembly according to the third aspect further includes a plate member. The plate member has an inner peripheral portion fixed to the crankshaft of the engine and an outer peripheral portion fixed to the flywheel. The plate member has a predetermined rigidity and absorbs a vibration along a rotation axis. In this aspect of the present invention, the plate member is interposed between the crankshaft of the engine and the flywheel. Therefore, it is possible to reduce the axial vibration by the flywheel assembly.

The foregoing and other objects, features, aspects, advantages and salient features of the present invention will become more apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
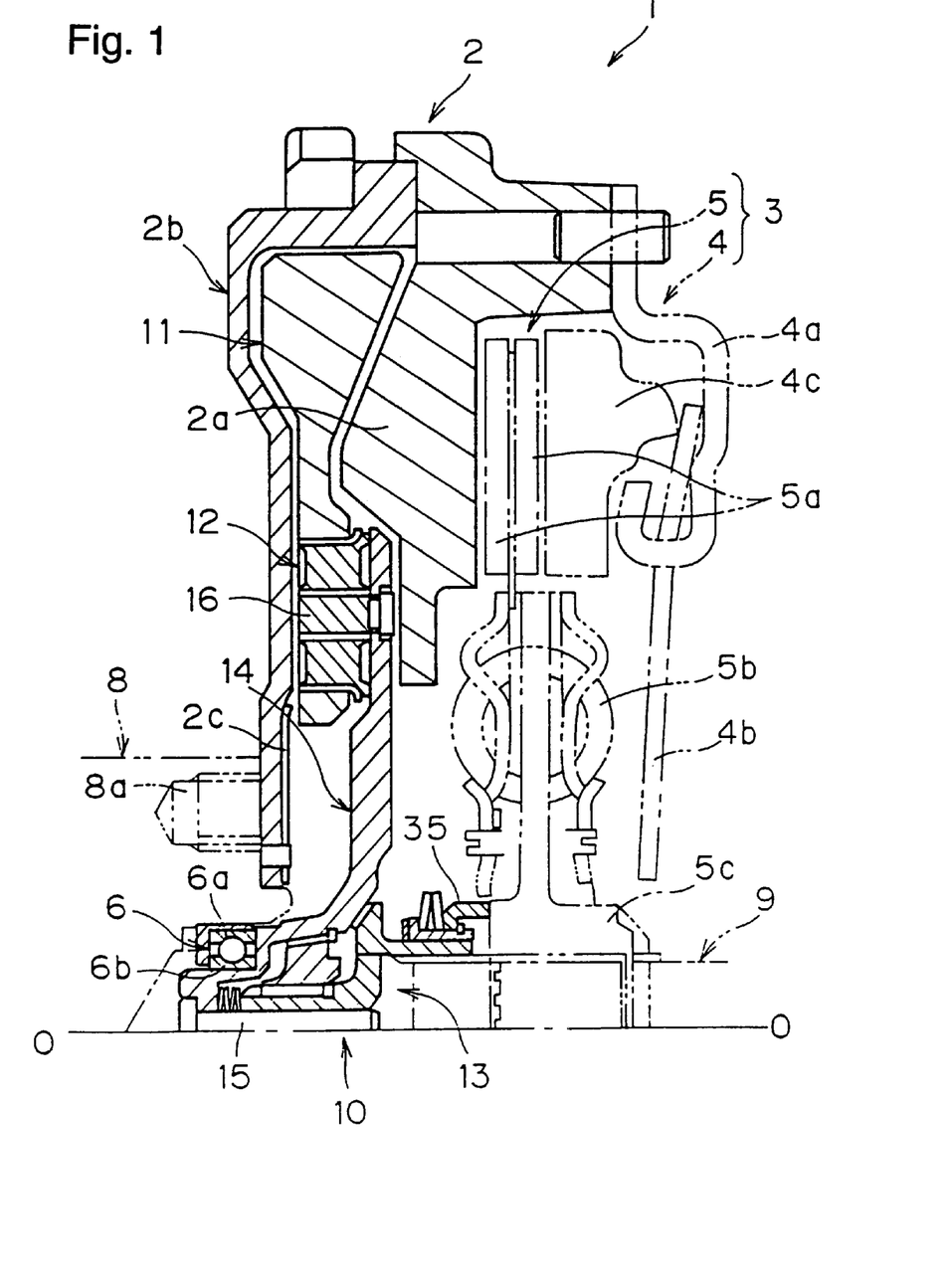
FIG. 1 is a partial cross-sectional view of the upper half of a flywheel assembly with a dynamic damper in accordance with one embodiment of the present invention.

Referring initially to FIG. 1, a partial cross-sectional view of a coupling mechanism 1 is illustrated in accordance with one embodiment of the present invention. The coupling mechanism 1 is basically formed of a flywheel assembly 2 and a main clutch 3. The main clutch 3 includes a clutch cover assembly 4 and a clutch disk assembly 5. The coupling mechanism 1 has a rotation axis represented by line O—O of FIG. 1.

The flywheel assembly 2, which is illustrated in FIG. 1, includes a dynamic damper 10 in accordance with one embodiment of the present invention. The flywheel assembly 2 and the dynamic damper 10 are part of a coupling mechanism 1, which engages and disengages a crankshaft 8 of an engine with an input shaft 9 of a transmission. The dynamic damper 10 functions to dampen vibrations of the transmission when coupled to the input shaft 9 of the transmission by a sub-clutch 13.

Figure 7:
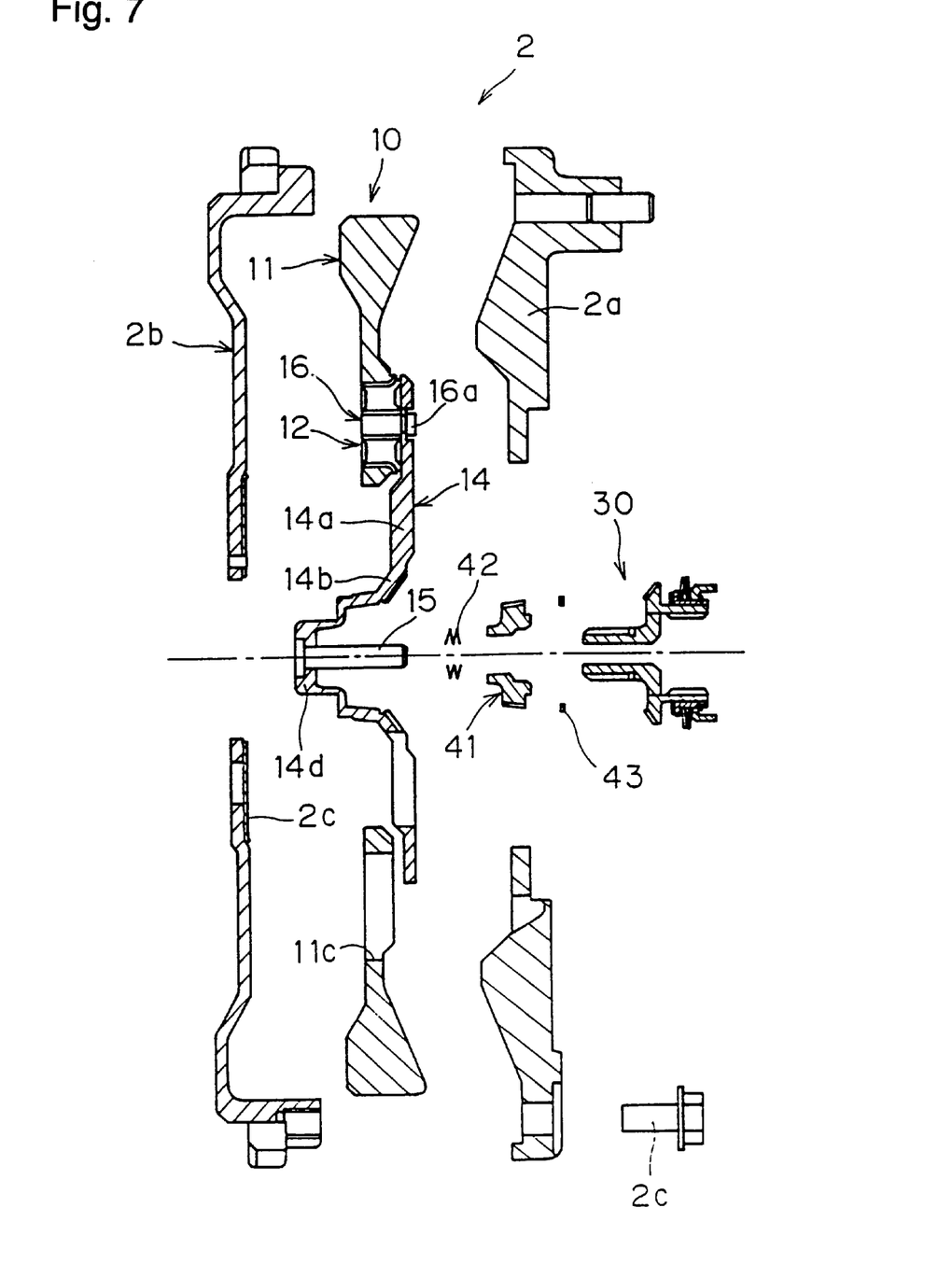
FIG. 7 is an exploded cross-sectional view of selected parts of the flywheel assembly illustrated in FIG. 1.

The flywheel assembly 2 is non-rotatably coupled to the crankshaft 8 of the engine. The flywheel assembly 2 is basically formed of a flywheel 2a, a flexible plate assembly 2b and the dynamic damper 10. As shown in FIG. 7, the flywheel assembly 2 is illustrated in an exploded form to show selected parts of the flywheel assembly 2. The flywheel 2 and the flexible plate assembly 2b are coupled together at their outer peripheral portions as shown in FIG. 1 in a conventional manner. The flexible plate assembly 2b is basically formed of a thick circular plate having a thin flexible plate 2c fixed to the inner peripheral portion of the thick circular plate. In particular, the inner end of the thin flexible plate 2c is fixedly secured to the inner end of the thick circular plate. The other end of the flexible plate 2c is fixed to the crankshaft 8 of the engine by seven bolts 8a, which are circumferentially and equally spaced from each other. The dynamic damper 10 will be described later in detail.

As shown in FIG. 1, the clutch cover assembly 4 of the main clutch 3 basically includes a clutch cover 4a, an annular diaphragm spring 4b and a pressure plate 4c. The clutch cover assembly 4 of the main clutch 3 is normally biased toward the engine (i.e., leftward as viewed in FIG. 1) by the diaphragm spring 4b. The clutch cover 4a is fixed at its outer peripheral portion to an end of the flywheel 2a near the transmission (i.e., right end as viewed in FIG. 1). The inner peripheral portion of the clutch cover 4a carries a radially middle portion of the diaphragm spring 4b via wire rings (not shown) in a conventional manner. The pressure plate 4c is held within the clutch cover 4a in a conventional manner by the outer peripheral portion of the diaphragm spring 4b and other parts (not shown). The pressure plate 4c axially moves when a release bearing (not shown) moves the inner periphery of the diaphragm spring 4b along the rotation axis O—O, i.e., in the axial direction for biasing the pressure plate 4c by the diaphragm spring 4b or releasing the diaphragm spring 4b from the same. The clutch cover assembly 4 operates to bias the pressure plate 4c toward the flywheel 2a, and thereby operates to hold the clutch disk assembly 5 between the flywheel 2a and the pressure plate 4c for frictionally engaging the flywheel assembly 4 and the clutch disk assembly 5 together.

The clutch disk assembly 5 of the main clutch 3 is basically formed of a frictional engagement portion with friction facings 5a, a splined hub 5c and coil springs 5b. The splined hub 5c has an inner bore with splines for engaging the splines of the input shaft 9 of the transmission for rotation therewith. The coil springs 5b elastically couple the frictional engagement portion and the splined hub 5c together in the rotating direction.

Referring to FIGS. 1 and 7, a structure of the dynamic damper 10 will be described below. The dynamic damper 10 is basically formed of a mass member (mass portion) 11, elastic portion assemblies (elastic portions) 12, an input plate (input portion) 14 and a sub-clutch 13.

Figure 2:
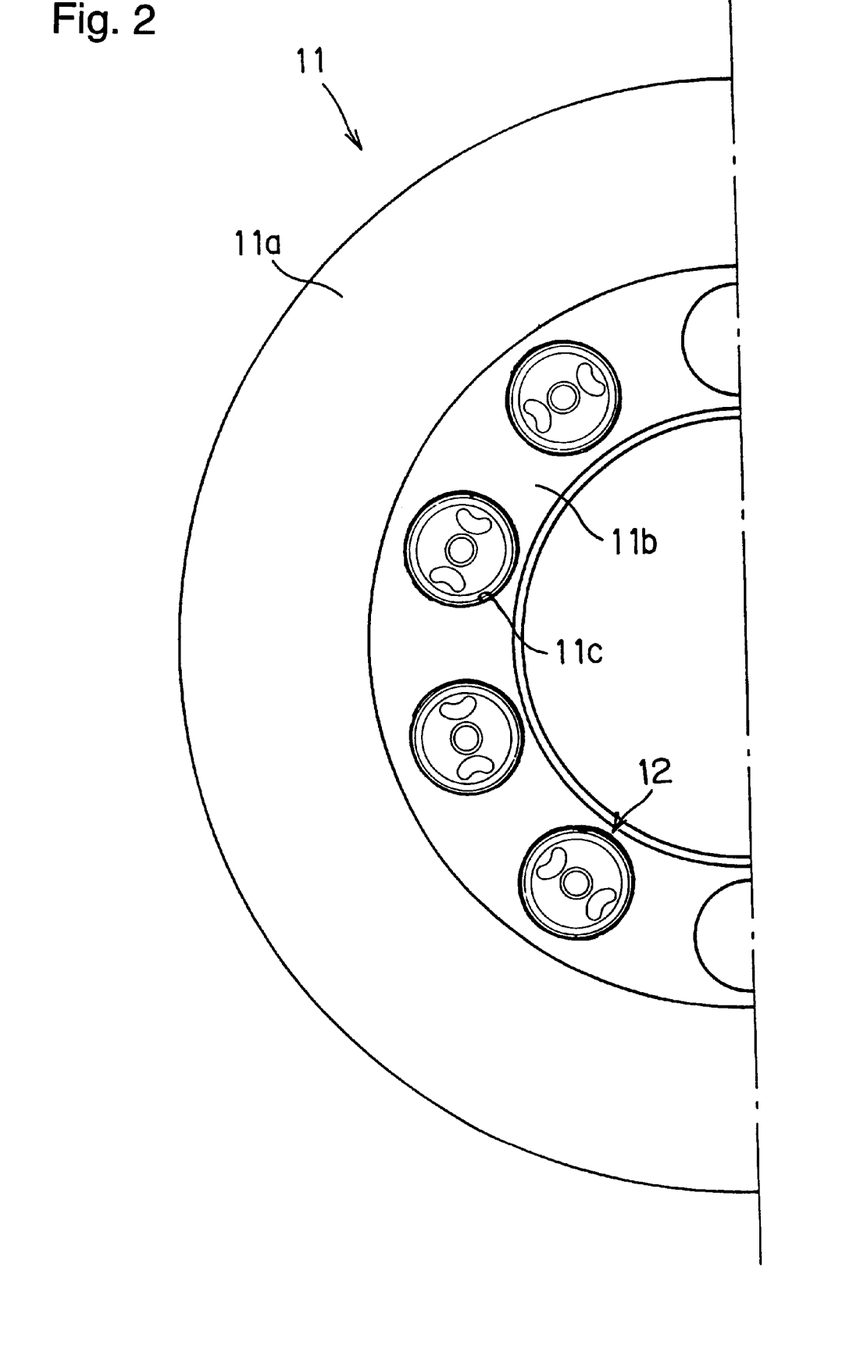
FIG. 2 is a partial inside elevational view of the mass member of the flywheel assembly illustrated in FIG. 1.

The mass portion 11 has an annular mass main portion 11a and annular or circular plate portion 11b. The main portion 11a has a generally triangular cross section which diverges radially outward. The annular or circular plate portion 11b is integrally formed at the inner section of the main portion 11a, as shown in FIGS. 1 and 2. The circular plate portion 11b is preferably provided with ten circular apertures 11c which are circumferentially equally spaced from each other, as shown in FIG. 2. Each of the circular apertures 11c receives one of the elastic portion assemblies 12 therein.

Figure 3:
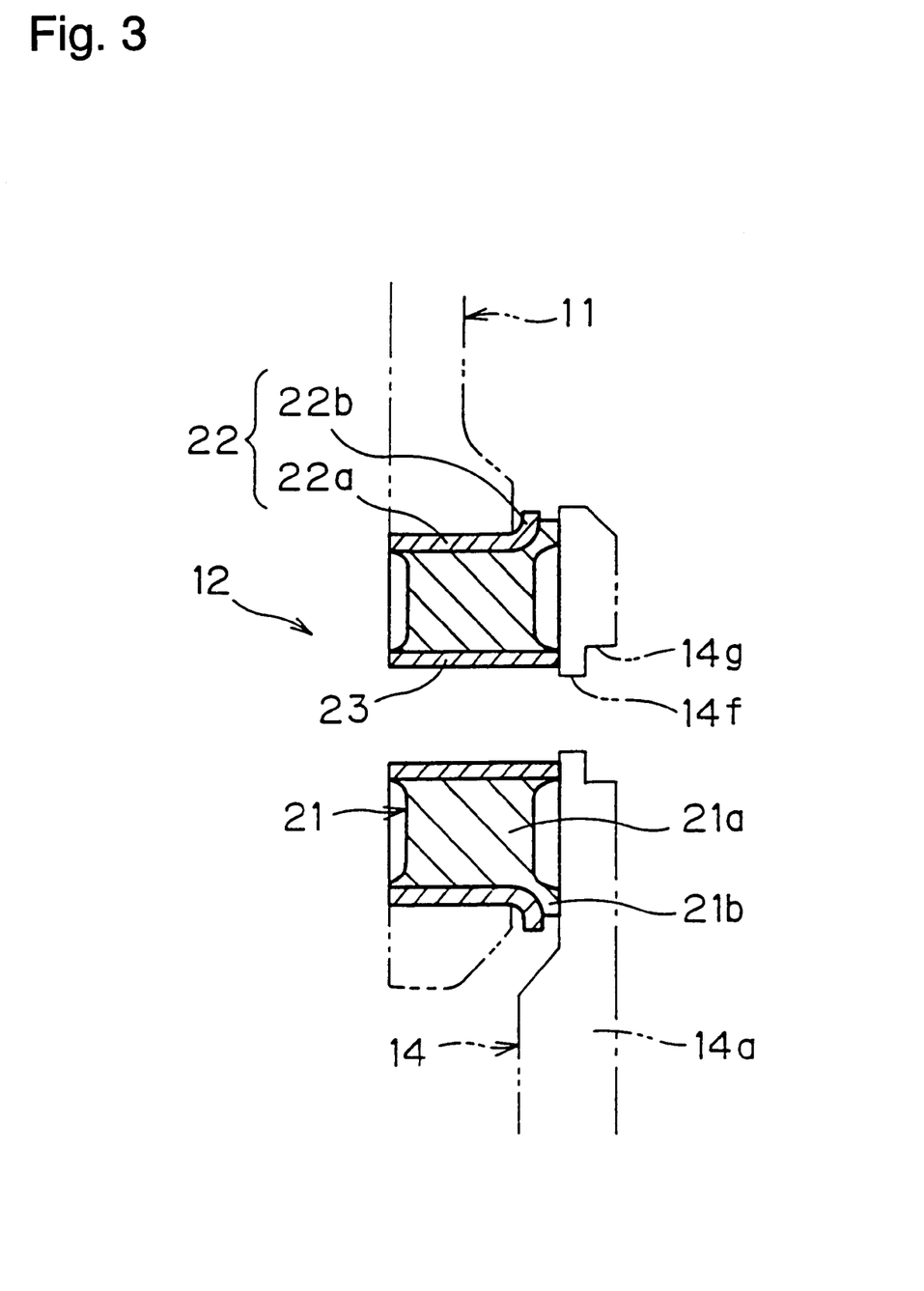
FIG. 3 is an enlarged partial cross-sectional view of an elastic portion assembly of the flywheel assembly illustrated in FIG. 1.
Figure 4:
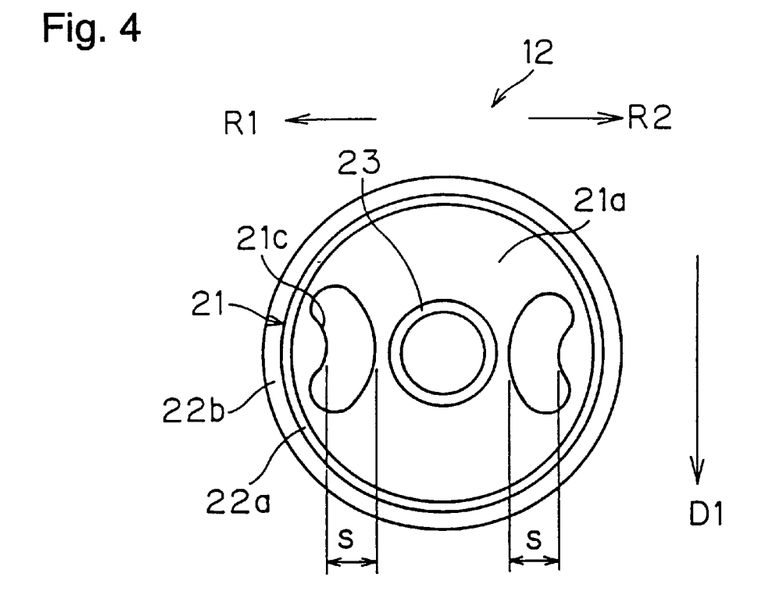
FIG. 4 is a right side elevational view of the elastic portion assembly illustrated in FIGS. 1 and 3 as viewed from the engine side of the flywheel assembly illustrated in FIG. 1.
Figure 5:
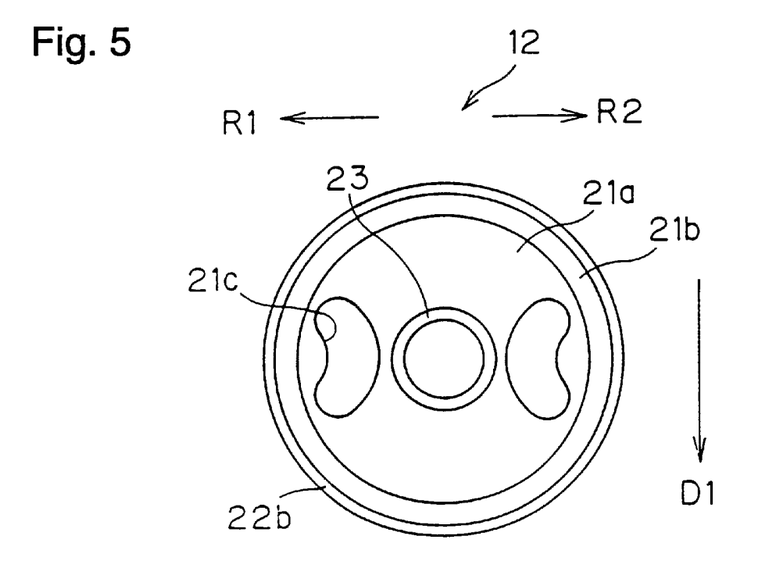
FIG. 5 is a left side elevational view of the elastic portion assembly illustrated in FIGS. 1, 3 and 4 as viewed from the transmission side of the flywheel assembly illustrated in FIG. 1.

The elastic portion assemblies 12 elastically couple the mass portion 11 and the input plate 14 together, as shown in FIGS. 1 and 3. As shown in FIGS. 3 to 5, each elastic portion assembly 12 is formed of a cylindrical rubber member 21, a radially outer cylindrical member 22, and a radially inner cylindrical member 23. The outer cylindrical member 22 is fixed to the outer peripheral surface of the rubber member 21. The radially inner cylindrical member 23 is fixed to the inner peripheral surface of the rubber member 21. The radially outer and inner cylindrical members 22 and 23 are made of a hard rigid material such as steel.

Each of the rubber members 21 is integrally formed of a main portion (first rubber portion) 21a and an outer peripheral projection (second rubber portion) 21b. The outer peripheral projection 21b is located on the outer peripheral surface (upper surface) of the main portion 21a. More specifically, the outer peripheral projection 21b is located on the right side as viewed in FIG. 3 (i.e., the side near the transmission) of the main portion 21a. As shown in FIGS. 4 and 5, each rubber member 21 is provided with two cavities 21c which extend axially therethrough. In FIGS. 4 and 5, directions R1 and R2 represent the circumferential direction, and a direction D1 represents a radial direction. As shown in FIG. 4, each cavity 21c has an oblong form or kidney-shaped with its length extending in the radial direction and has its width (which will be referred to as a space) S extending in the circumferential direction. Accordingly, cavities 21c are longer in the radial direction than in the circumferential direction. Accordingly, cavities 21c are longer in the radial direction than in the circumferential direction.

The radially inner cylindrical member 23 has a cylindrical form and has an axial length substantially equal to the axial length of the rubber member 21 as shown in FIG. 3. The radially outer cylindrical member 22 also has a substantially cylindrical form. However, the axial length of the radially outer cylindrical member 22 is shorter than that of the radially inner cylindrical member 23 and the rubber member 21. The radially outer cylindrical member 22 is formed of a cylindrical portion 22a and a bent portion 22b extending radially outward from an end of the cylindrical portion 22a near the transmission side. The surface of the bent portion 22b facing the transmission is adhered to the surface of the outer peripheral projection 21b facing the engine.

Each elastic portion assembly 12 is disposed in the circular aperture 11c of the mass member 11, as shown in FIGS. 1, 2 and 7. The outer peripheral surface of the cylindrical portion 22a of the radially outer cylindrical member 22 is fixed to the inner peripheral surface of the circular aperture 11c. Each of the radially inner cylindrical member 23, on the other hand, is coupled to the outer peripheral portion of the input plate 14 through a pin 16 as shown in FIG. 1. Thus, each elastic portion assembly 12 elastically couples the mass portion 11 and the input plate 14 together in the circumferential, axial and radial directions.

Figure 12:
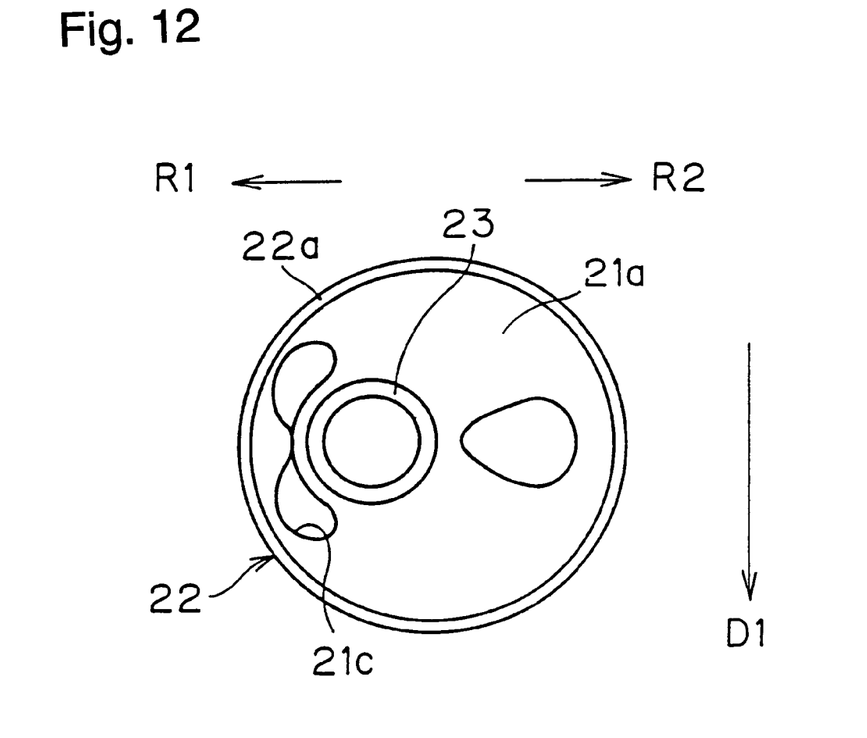
FIG. 12 is a side elevational view, similar to FIG. 4, of the elastic portion assembly, but with it in a deformed state.

When a small amount of torque transmitted between the mass member 11 and the input plate 14, the elasticity of the elastic portion assemblies 12 in the circumferential direction primarily depends on a bending rigidity of the main portions 21a of the rubber members 21, which are diametrally opposed to each other with the radially inner cylindrical member 23 therebetween. When the torque transmitted between the mass member 11 and the input plate 14 increases, the mass member 11 and the input plate 14 move relatively to each other in the direction of rotation. This relative movement causes one of the cavities 21c in each rubber member 21 to collapse as shown in FIG. 12. Thereby, the elasticity of the elastic portion assembly 12 in the circumferential direction is primarily determined by the compression rigidity of the portion of the main portion 21a of the rubber member 21. More specifically, the compression rigidity of the portion which forms an end portion, in the circumferential direction, of the radially inner cylindrical member 23 and neighbors to the cavity 21c having the disappeared spaces. As can be seen from FIG. 12, after the spaces of one of the cavities 21c collapses or essentially disappears, the mass portion 11 and the input plate 14 are coupled substantially rigidly with substantially no elasticity therebetween.

The axial elasticity of the elastic portion assembly 12 is primarily determined by the compression rigidity of the outer peripheral projection 21b of the rubber member 21 in the axial direction as shown in FIG. 3.

The elasticity of the elastic portion assembly 12 in the radial direction is primarily determined by the compression rigidity of the main portion 21a of the rubber member 21. More specifically, the elasticity of the elastic portion assembly 12 in the radial direction is primarily determined by the compression rigidity of the portions of the main portion 21a which are diametrically opposed to each other with the radially inner cylindrical members 23 therebetween (see FIGS. 3 to 5).

Figure 8:
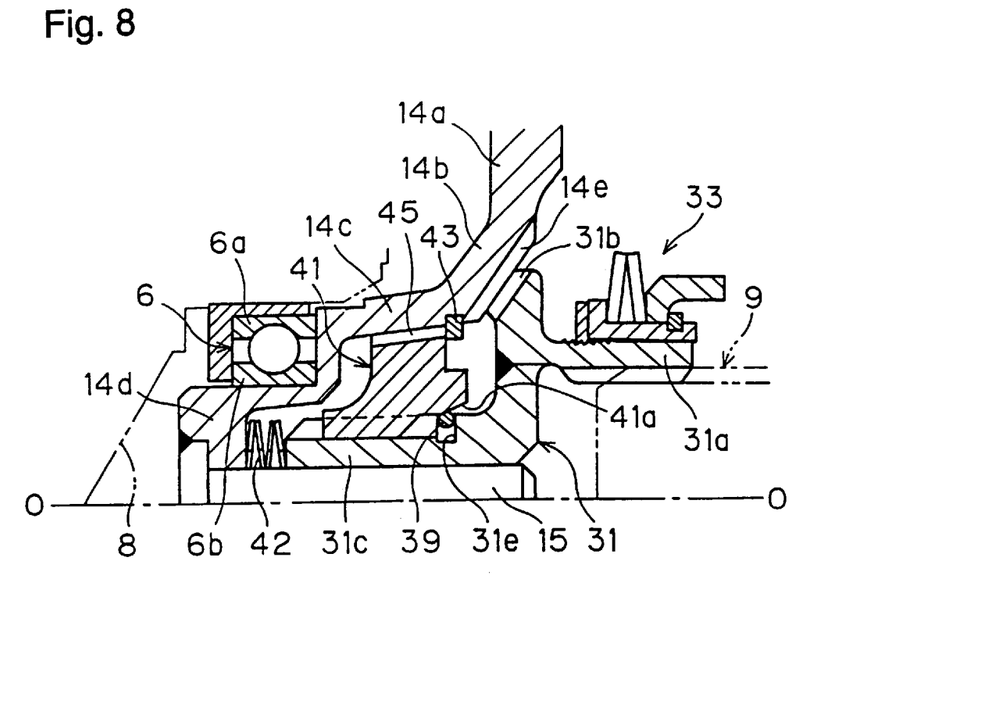
FIG. 8 is a partial cross-sectional view of the sub-clutch of the flywheel assembly illustrated in FIGS. 1 and 7, with the sub-clutch in a first disengaged position.

As shown in FIGS. 1, 7 and 8, the input plate 14 is integrally formed of an annular plate portion 14a, a conical portion 14b, a cylindrical portion 14c and a concave portion 14d. The input plate 14 is fixed at its radially inner portion to an inner race 6b of the ball bearing 6 as shown in FIG. 1, while an outer race 6a of the bearing 6 is fixed to the crankshaft 8 of the engine as shown in FIG. 1. Accordingly, the input plate 14 is coupled to the crankshaft 8 of the engine via the ball bearing 6 for rotational movement therebetween. However, the input plate 14 is non-movably coupled to the crankshaft 8 of the engine in both the axial and radial directions.

As shown in FIGS. 3 and 7, the annular plate portion 14a has apertures 14f located at its radially outer portions, which restrict the movement of the respective pins 16 in the rotating and radial directions. As seen in FIG. 3, the annular plate portion 14a is also provided with a plurality of recesses 14g for restricting the movement of heads 16a of the respective pins 16 toward the engine. Thus, movement of the elastic portion assemblies 12 toward the engine (i.e., leftward as viewed in FIG. 3) is restricted by the heads 16a of the pins 16, which engage recesses 14g.

The movement of the elastic portion assemblies 12 toward the transmission is restricted by the ends of the radially inner cylindrical members 23 on the transmission side contacting the surface of the annular plate member 14a which faces toward the engine side. The movement of the elastic portion assemblies 12 toward the transmission is also restricted by the surfaces of the outer peripheral projections 21b on the transmission side contacting the surface of the annular plate member 14a facing the engine side.

The conical portion 14b extends radially inward and obliquely toward the engine from the inner periphery of the annular plate portion 14a. The conical portion 14b is provided at its inner peripheral surface with teeth 14e (second gear) as shown in FIG. 8.

The cylindrical portion 14c extends from the inner periphery of the conical portion 14b toward the engine substantially along the axis O—O. The cylindrical portion 14c has a tapered inner peripheral surface converging toward the engine.

The concave portion 14d is arranged radially inside the cylindrical portion 14c, and is provided at a center of its bottom with a recess and an aperture into which a core member 15 is inserted and fixed as noted in FIG. 1. The outer peripheral surface of the concave portion 14d is fixed to the inner race 6b of the ball bearing 6 (see FIGS. 1 and 8).

As described above, the mass portion 11 is coupled to the elastic portion assemblies 12. The elastic portion assemblies 12 are in turn coupled to the input plate 14, which is carried on the crankshaft 8 of the engine. Thus, these three components (the mass portion 11, the elastic portion assemblies 12 and the input plate 14) are rotatably carried on the crankshaft 8 of the engine.

The sub-clutch 13 is a clutch mechanism of a gear-meshing type for selectively engaging and disengaging the above three components (the mass member 11, the elastic portion assemblies 12 and the input plate 14) with and from the input shaft 9 of the transmission. As shown in FIGS. 7–11, the sub-clutch 13 is basically formed of a synchronous gear assembly 30, a synchronous block 41, a return spring 42, a snap ring 43 and the inner peripheral portions 14b, 14c and 14d of input plate 14.

As shown in FIGS. 6 and 8–11, the synchronous gear assembly 30 basically includes a main body 31, a force reducing mechanism 33, a one-way engagement member 34 and a wire ring 39. The synchronous gear assembly 30 is provided with a position correcting mechanism 32, which is formed by one-way grooves 31d and one-way engagement member 34 as discussed below.

The main body 31 is basically formed of a large cylindrical portion 31a, a synchronous gear (first gear) 31b extending radially outward from the end of the large cylindrical portion 31a nearest to the engine, and a small cylindrical portion 31c extending radially inward from the end of the large cylindrical portion 31a nearest to the engine.

Figure 6:
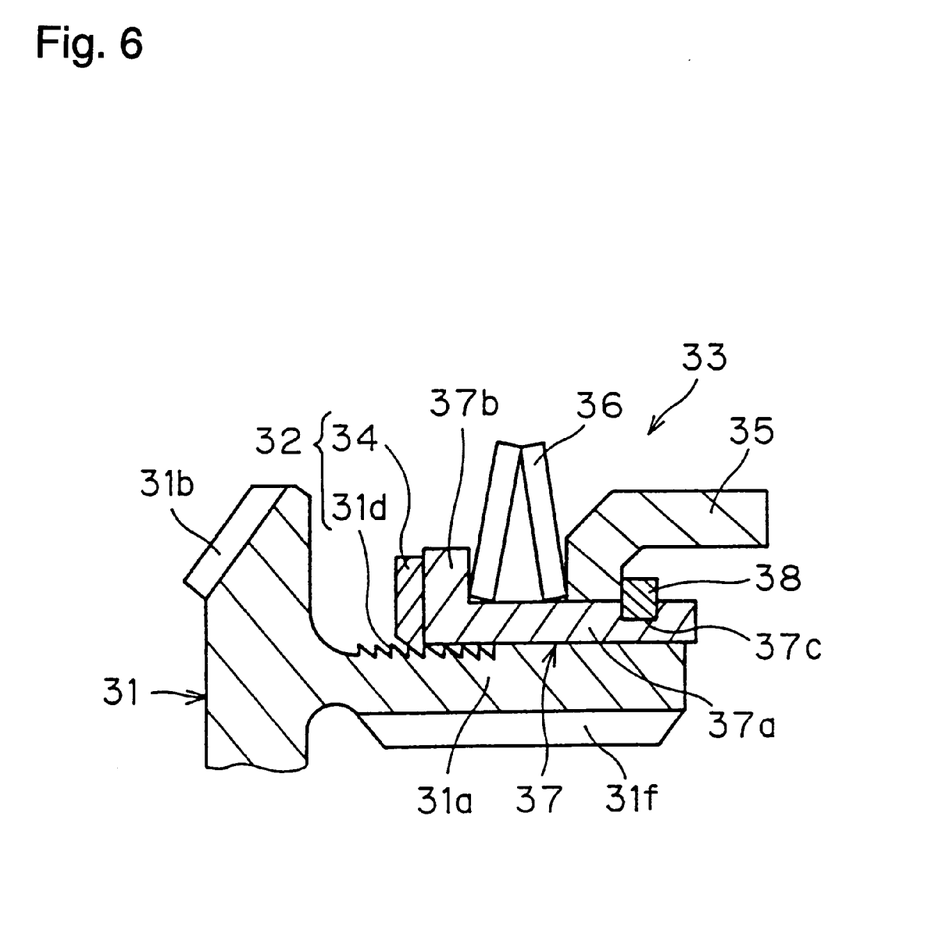
FIG. 6 is an enlarged partial cross-sectional view of part of the sub-clutch and the position correcting mechanism of the flywheel assembly illustrated in FIG. 1.

The large cylindrical portion 31a is provided at its inner peripheral surface with spline grooves 31f which are engaged with the splines of the input shaft 9 of the transmission (see FIG. 6). Thus, the main body 31 is spline-engaged with the input shaft 9 of the transmission. This arrangement allows main body 31 to move axially with respect to the input shaft 9 of the transmission. However, the main body 31 cannot rotate with respect to the input shaft 9 of the transmission. The large cylindrical portion 31a is also provided at its outer peripheral surface with one-way grooves 31d as shown in FIG. 6. The surfaces of each one-way groove 31d facing the engine, i.e., the surface defining the right edge of the groove as seen in FIG. 6, is substantially perpendicular to the rotation axis O—O. The surface of the one-way grooves 31d facing the transmission, i.e., the left surface as seen in FIG. 6, are inclined such that their inner peripheries are shifted toward the transmission with respect to their outer peripheries.

Figure 10:
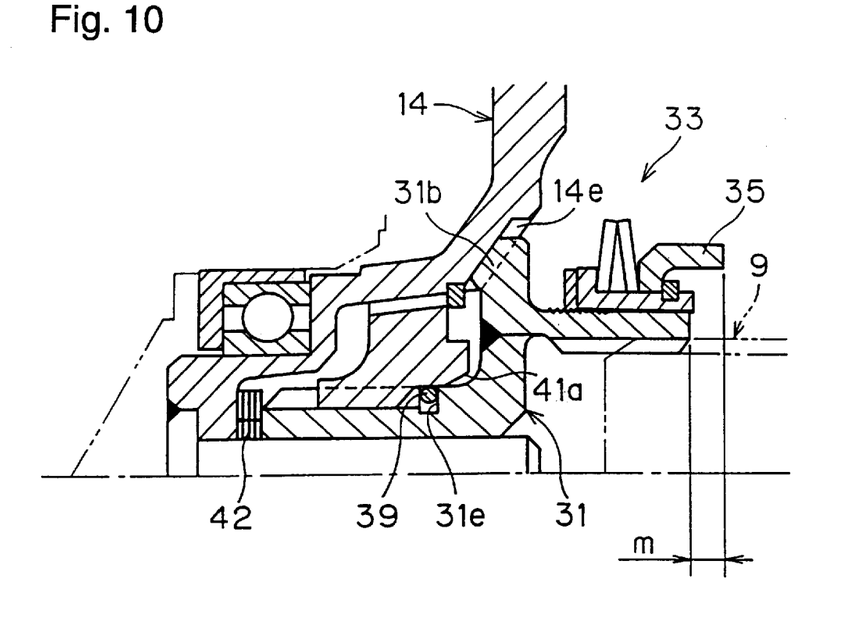
FIG. 10 is a partial cross-sectional view of the sub-clutch of the flywheel assembly illustrated in FIGS. 1 and 7, with the sub-clutch in a first engaged position.

The synchronous gear 31b is opposed to the teeth 14e of the conical portion 14b of the input plate 14. A small space is formed between the teeth 14e of the input plate 14 and the teeth of the synchronous gear 31b when the sub-clutch 13 is in the disengaged state shown in FIG. 8. When the sub-clutch 13 is in the engaged state as shown in FIG. 10, the teeth 14e of input plate 14 engages the teeth of the synchronous gear 31b.

The small cylindrical portion 31c of the main body 31 has a smaller diameter than the large cylindrical portion 31a. The inner peripheral surface of the small cylindrical portion 31c is in axially movable contact with the core member 15. The outer peripheral surface of the small cylindrical portion 31c is provided with teeth at its portion nearest to the engine (left portion as viewed in FIG. 8), and is also provided with an annular groove 31e at a portion nearest to the transmission (right potion as viewed in FIG. 8). The opposite side surfaces of the groove 31e restrict the axial movement of the wire ring 39 with respect to the main body 31. The inner peripheral surface of the groove 31e has a diameter smaller than the inner diameter of the wire ring 39 so that the wire ring 39 in the groove 31e can elastically and radially deform towards the center of the assembly.

Referring to FIGS. 1 and 6, the force reducing mechanism 33 is provided for reducing the axial force being transmitted to the main body 31 from the spline hub 5c of the clutch disk assembly 5 to a predetermined value. The force reducing mechanism 33 is basically formed of a transmitting member 35, a pair of springs 36, a spring retainer member 37 and a ring 38, as shown in FIG. 6. The end of the transmitting member 35 nearest to the transmission contacts the end surface of the spline hub 5c which faces the engine, as shown in FIG. 1.

As shown in FIG. 6, the spring retainer member 37 is formed of a cylindrical inner periphery retaining portion 37a and an axial restricting portion 37b extending radially outward from the end of the inner periphery retaining portion 37a which is nearest to the engine. A groove 37c is formed at a portion of the outer peripheral surface of the inner periphery retaining portion 37a nearest to the transmission for holding the ring 38 therein. The springs 36 are preferably two annular conical springs. Each spring 36 has an inner diameter nearly equal to the outer diameter of the inner periphery retaining portion 37a. The springs 36 are held between the end surface of the transmitting member 35 nearest to the engine and the end surface of the axial restricting portion 37b nearest to the transmission. The ring 38 is fixed in the groove 37c and restricts the movement of the transmitting member 35 toward the transmission.

The one-way engagement member 34 is an annular plate, which transmits the axial force between the force reducing mechanism 33 and the main body 31. As mentioned above, the one-way engagement member 34, together with the main body 31 and the one-way grooves 31d forms the position correcting mechanism 32. The inner peripheral surface of the one-way engagement member 34 is tapered and diverges toward the engine. The inclination of the inner peripheral surface of the one-way engagement portion 34 is substantially equal to the inclination of the surfaces of the one-way grooves 31d which face the transmission. The surface of the one-way engagement member 34 facing the transmission is in contact with the axial restriction portion 37b of the spring retainer member 37 of the force reducing mechanism 33. The one-way engagement member 34 has a predetermined elasticity and radially deformed in an outward direction by a force applied radially outward to the inner peripheral surface thereof.

The position correction mechanism 32 utilizes the meshing of the one-way engagement member 34 with one of the one-way grooves 31d (i.e., a pair of one-way engagement portion) as well as elastic deformation of the one-way engagement member 34 (see FIG. 6 to obtain the correct relative position of the main body 31 and the force reducing mechanism 33). This position correction mechanism 32 prevents the relative movement in the axial direction between the force reducing mechanism 33 and the main body 31 when the axial force transmitted between the force reducing mechanism 33 and the main body 31 does not exceed a predetermined value (F1). When the axial force transmitted between the force reducing mechanism 33 and the main body 31 exceeds the predetermined value (F1), the position correction mechanism 32 shifts the main body 31 of the force reducing mechanism 33 toward the engine. When the axial force transmitted between the force reducing mechanism 33 and the main body 31 is not larger than the predetermined value (F1), the force biasing the force reducing mechanism 33 toward the engine is transmitted to the main body 31 through the contact portions of the inner peripheral surface of the one-way engagement member 34 and the surface of the one-way groove 31d opposed to the transmission. Thereby, the main body 31 moves the substantially same distance as the force reducing mechanism 33. When the axial force transmitted between the force reducing mechanism 33 and the main body 31 exceeds the predetermined value (F1), a radial reaction force (F2) acts on the one-way engagement portion 34 and the main body 31 through the contact portions of the inner peripheral surface of the one-way engagement member 34 and the surface of the one-way groove 31d opposed to the transmission. When this force (F2) exceeds a predetermined value the force (F2) elastically deforms the one-way engagement member 34 to increase the inner diameter of the one-way engagement member 34 above the outer diameter of the surface of the one-way groove 31d. Thereby, the one-way engagement member 34 and the one-way groove 31d, which axially coupled the force reducing mechanism 33 and the main body 31 together, are disengaged from each other, and thus the coupling between the force reducing mechanism 33 and the main body 31 is temporarily released so that the force reducing mechanism 33 moves toward the engine with respect to the main body 31. Thereby, the one-way engagement portion 34 engages with the one-way groove 31d again in a new position.

Referring now to FIGS. 8–11, the wire ring 39 has a circular section and a predetermined elasticity, and is disposed in the groove 31e. The wire ring 39 is designed to control the engagement between the cylindrical portion 14c of the input plate 14 and the synchronous block 41.

The synchronous block 41 has an inner peripheral surface which is splined and engages the splines of the small cylindrical portion 31c of the main body 31 of the synchronous gear assembly 30. Thus, synchronous block 41 is non-rotatably and axially movably carried by the main body 31. The synchronous block 41 has a conical surface 41a, which converges toward the engine and engages wire ring 39. The conical surface 41a has one end with a diameter larger than the outer diameter of the wire ring 39 and the other end with a diameter smaller than the outer diameter of the wire ring 39 (see FIG. 8). The conical surface 41a contacts the wire ring 39 for transmitting a force between them.

A friction member 45 is attached to the outer peripheral surface of the synchronous block 41. The outer peripheral surface of the synchronous block 41 and the outer surface (friction surface) of the friction member 45 have the substantially same inclination as the inner peripheral surface of the cylindrical portion 14c of the input plate 14. The outer peripheral surface of the synchronous block 41 and the outer friction surface of the friction member 45 are frictionally engaged with the inner peripheral surface of the cylindrical portion 14c when the sub-clutch 13 is engaged.

The return spring 42 is preferably formed of four annular conical springs with their inner peripheries contacting the outer peripheral surface of the core member 15. The end of the return spring 42 nearest to the engine contacts the concave portion 14d of the input plate 14. The other end of the return spring nearest to the transmission contacts the small cylindrical portion 31c of the main body 31 of the synchronous gear assembly 30. Thereby, the return spring 42 biases the main body 31 of the synchronous gear assembly 30 toward the transmission.

The snap ring 43 has a square section, and is fitted into a groove formed at an end of the inner peripheral surface of the cylindrical portion 14c of the input plate 14 which is nearest to the transmission. The snap ring 43 contacts the outer peripheral portion of the end of the synchronous block 41 nearest to the transmission for restricting the axial movement of the synchronous block 41 toward the transmission.

The operation of the coupling mechanism 1 and the dynamic damper 10 will now be described in more detail. The rotation of the crankshaft 8 of the engine is selectively transmitted to the input shaft 9 of the transmission through the flywheel assembly 2 and the main clutch 3. When the main clutch 3 is in the disengaged state, i.e., the clutch disk assembly 5 is not frictionally engaged with the flywheel 2a and the pressure plate 4c. Also, in the disengaged state, the spline hub 5c is in the axial position shown in FIG. 1, and the sub-clutch 13 is in the disengaged state shown in FIG. 8. When the sub-clutch 13 is in the disengaged state shown in FIG. 8, the synchronous gear 31b is not in mesh with the teeth 14e, and the friction member 45 of the synchronous block 41 is not in frictional engagement with the cylindrical portion 14c of the input plate 14. Therefore, the synchronous gear assembly 30 and the synchronous block 41 rotate together with the input shaft 9 of the transmission, but the input plate 14, the elastic portion assembly 12 and the mass member 11 are independent of the input shaft 9 of the transmission.

When the main clutch 3 is to be engaged, the diaphragm spring 4b forces the pressure plate 4c to move toward the flywheel 2a so that the clutch disk assembly 5 is held between the flywheel 2a and the pressure plate 4c. Thereby, the crankshaft 8 of the engine is coupled to the input shaft 9 of the transmission. In this operation, as is well known, the flexible plate 2c of the flexible plate assembly 2b absorbs the axial vibration of the crankshaft 8 of the engine, and the coil springs 5b and other parts of the clutch disk assembly 5 dampen and absorb the torque variation.

Figure 9:
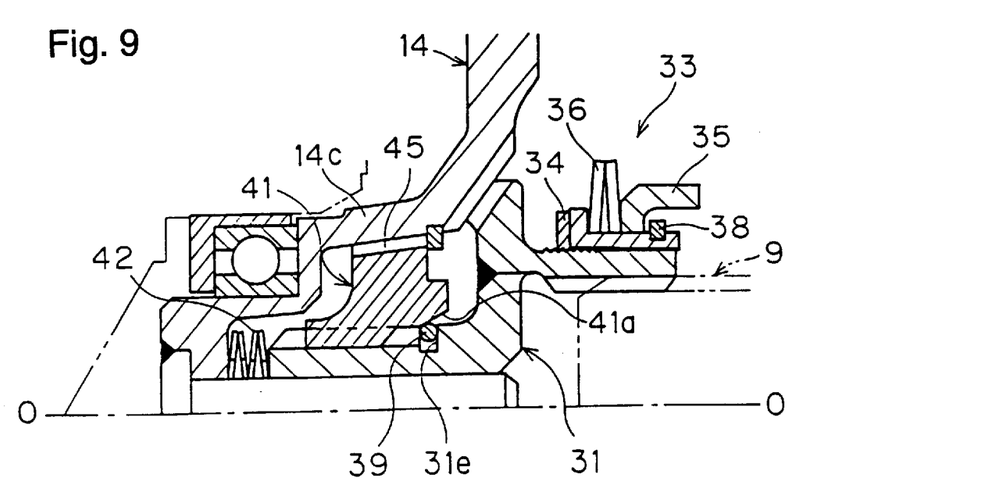
FIG. 9 is a partial cross-sectional view of the sub-clutch of the flywheel assembly illustrated in FIGS. 1 and 7, with the sub-clutch in a second disengaged position.

When the main clutch 3 is engaged, the spline hub 5c of the clutch disk assembly 5 moves axially toward the engine. Thereby, the spline hub 5c pushes the transmitting member 35 toward the engine to compress the springs 36 by a predetermined length (see FIG. 9). Before the state shown in FIG. 9 is attained, the main body 31 receives a reaction force of the springs 36 toward the engine. However, the main body 31 hardly moves in the axial direction because the conical surface 41a of the synchronous block 41 restricts the axial movement of the wire ring 39. As the reaction force of the springs 36 increases, the wire ring 39 elastically deforms to reduce its diameter. The elastic reaction force of the wire ring 39 acts radially outward on the synchronous block 41 to push the same against the cylindrical portion 14c of the input plate 14. In this manner, the rotation speeds of the input shaft 9 of the transmission and the input plate 14 are gradually synchronized with each other owing to the friction between the friction member 45 of the synchronous block 41 and the cylindrical portion 14c of the input plate 14 until the structure attains the state shown in FIG. 9.

When the springs 36 in the state shown in FIG. 9 are further compressed to the state shown in FIG. 10, the reaction force of the springs 36 and the amount of the elastic deformation of the wire ring 39 increase so that the outer diameter of the deformed wire wing 39 becomes smaller than the inner diameter of the conical surface 41a. Thereby, the wire ring 39 receives from the synchronous block 41 only the force produced by the friction resistance between the wire ring 39 and the inner peripheral surface of the synchronous block 41. Since this force is much smaller than the reaction force of the springs 36, the springs 36 expand to move axially the main body 31 toward the engine while compressing the return spring 42. Thereby, the teeth of the synchronous gear 31b is engaged with the teeth 14e (see FIG. 10). In this operation, the rotation of the input shaft 9 of the transmission and the rotation of the input plate 14 are synchronized to a certain extent so that the teeth of the synchronous gear 31b can smoothly mesh with the teeth 14e. Thereafter, the input shaft 9 of the transmission is coupled to the dynamic damper 10 through the teeth of the synchronous gear 31b and the teeth 14e meshing with each other so that a sufficient torque transmission capacity can be achieved.

When the dynamic damper 10 is coupled to the input shaft 9 of the transmission, the dynamic damper 10 damps neutral noises of the transmission and noises during driving. In particular, the dynamic damper 10 actively damps the vibration of the transmission in a partial rotation range.

Figure 11:
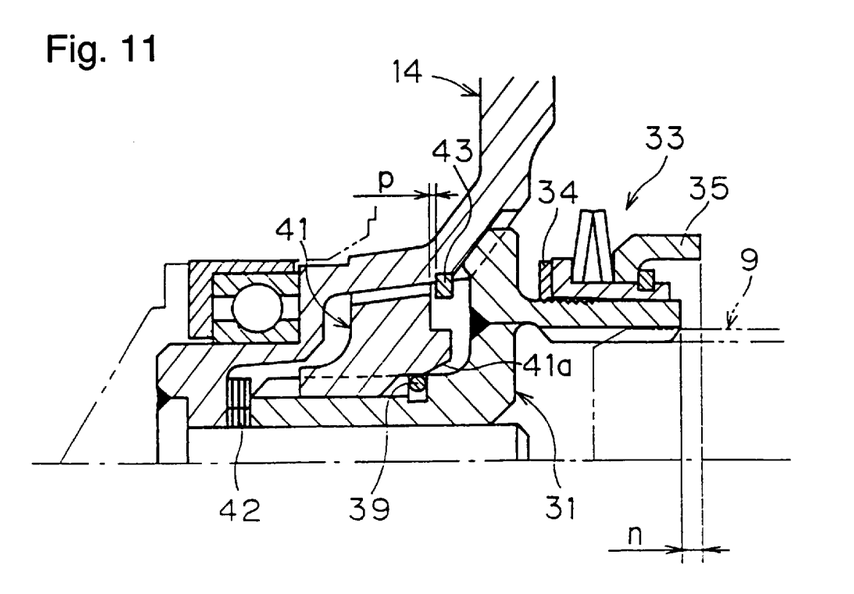
FIG. 11 is a partial cross-sectional view of the sub-clutch of the flywheel assembly illustrated in FIGS. 1 and 7, with the sub-clutch in a second engaged position.

When the coupling mechanism 1 is used for a long term, the friction facings 5a of the clutch disk assembly 5 of the main clutch 3 wear to reduce their axial length or thickness. This wear of the friction facings 5a increases the distance by which the spline hub 5c must move axially to engage the flywheel 12. In this case, the force reducing mechanism 33 moves further toward the engine from the position shown in FIG. 10. However, the concave portion 14d of the input plate 14 prevents the movement of the main body 31 toward the engine through the return spring 42 which is fully compressed so that a large reaction force occurs between the main body 31 and the force reducing mechanism 33. This reaction force pushes radially outward the one-way engagement member 34 through the surface of the one-way groove 31d of the main body 31 opposed to the transmission. Thereby, the one-way clutch engagement member 34 elastically deforms to increase its diameter so that the one-way engagement member 34 is released from one of the one-way grooves 31d and moves to the next one-way groove 31d. Thus, the force reducing mechanism 33 shifts toward the engine with respect to the main body 31 (see FIG. 11). In this manner, the axial positional relationship between the main body 31 and the force reducing mechanism 33 is corrected by the position correction mechanism 32 in accordance with the amount of wear occurring in the friction facings 5a. Thereby, the relative distance from the end of the main body 31 nearest to the transmission to the end of the transmitting member 35 nearest to the transmission changes from m as shown in FIG. 10 to n as shown in FIG. 11.

When the friction member 45 of the synchronous block 41 of the sub-clutch 13 wears, an axial component of the force by which the wire ring 39 pushes the conical surface 41a of the synchronous block 41 acts to move the synchronous block 41 toward the transmission. Thereby, as shown in FIG. 11, the synchronous block 41 and the input plate 14 shift in the axial direction relative to each other to compensate for the amount of wear occurring in the friction member 45. This axial shift is due to the inclination of the inner peripheral surface of the cylindrical portion 14c of the input plate 14. In FIG. 11, the distance of the above relative shifting between the synchronous block 41 and the input plate 14 is equal to p, and the gap having a length of p formed between the snap ring 43 and the synchronous block 41.

When the main clutch 3 is disengaged and the spline hub 5c moves toward the transmission, the reaction force of the return spring 42 moves the respective components of the sub-clutch 13 toward the transmission to disengaged the sub-clutch 13.

The advantages that can be achieved by employing the structure of the first embodiment of the present invention in the coupling mechanism 1 will now be discussed.

First, the mass member 11 is radially and axially coupled to the input plate 14 at its radially inner side by the elastic portion assemblies 12. Thus, the mass member 11 is coupled to the input shaft 9 of the transmission by the elastic portion assemblies 12 which include the rubber members 21. This results in the elastic portion assemblies 12 concentratedly functioning to hold and position the input portion of the mass member 11 with respect to the input plate 14 in the rotating, radial and axial directions. Therefore, it is not necessary to arrange an independent support mechanism or the like. For example, an independent support mechanism is not needed at the radially outside portion of the mass member 11. This allows the mass member to be increased in mass. Therefore, it is possible to increase a range in which damper characteristics can operate. Since each of the elastic portion assemblies 12 has an anisotropy, it is possible to set satisfactory the elastic characteristics of the elastic portion assemblies 12 in the rotating direction to correspond to the damper characteristics. Moreover, it is possible to set the elastic characteristics of the elastic portion assemblies 12 in the radial direction for supporting the mass member 11 without interfering with another member.

Secondly, the dynamic damper 10 employs the rubber members 21 in the elastic portion assemblies 12. This results in the structure of the elastic portion assemblies 12 having an elasticity not only in the rotating direction but also in the axial direction. Therefore, the dynamic damper 10 can operate in response to the axial vibrations for dampening the axial vibrations. The transmission has a characteristic frequency with respect to the torsional vibration and a characteristic frequency with respect to the axial vibration, which are different from each other. Therefore, the intended frequency range of the torsional vibration to be dampened is different from the intended frequency range of the axial vibration to be dampened. In this connection, the rubber members 21 having elasticities in the rotating and axial directions is provided with the outer peripheral projection 21b. Therefore, the elasticity of the elastic portion in the rotating direction and the elasticity of the elastic portion in the axial direction can be determined independently from each other, and it is possible to reduce efficiently both the kinds of vibrations, i.e., the torsional vibration in the intended frequency range and the axial vibration in the intended frequency range.

Thirdly, deterioration of the rubber members 21 can be suppressed in the dynamic damper 10 of the foregoing embodiment. The dynamic damper 10 receive a large torque, for example, when the main clutch 3 is engaged to start the rotation of the input shaft 9 of the transmission. This large torque may apply an excessive stress to the rubber members, which is not allowed in view of strength, and therefore, the large torque may cause deterioration of the rubber members. In this embodiment, however, the rubber members 21 are provided with the cavities 21a each having a predetermined spaces. Therefore, even if a large torque is applied between the mass member 11 and the input plate 14, which is coupled to the input shaft 9 of the transmission, the input plate 14 and the mass member 11 are substantially rigidly coupled together after the rubber members 21 deform to a certain extent eliminating the spaces of the cavity 21. The majority of the rubber members 21a re not subjected to the force larger than that corresponding to the predetermined deformation which eliminates the spaces. Accordingly, the rubber members 21 employed in the dynamic damper 10 can reliably have the intended strength. Since the rubber members 21 between the radially outer and inner cylindrical members 22 and 23 has the cylindrical form in this embodiment, it is possible to suppress concentration of the stress in the rubber members 21 which may occur when it receives a force in the circumferential direction.

Fourthly, the plurality of elastic portion assemblies 12 are employed for coupling the input plate 14 and the mass member 11. Therefore, the portion of each elastic portion assembly 12 coupled to the input plate 14 and the portion thereof coupled to the mass member 11 can be located at the opposite sides of each elastic portion assembly 12, in the circumferential direction. Therefore, the force transmitted from the input plate 14 to the mass member 11 does not act as a shearing force on the rubber members 21, but acts as compressing and bending forces on the rubber members 21. In this manner, the shearing deformation of the rubber members 21 is effectively suppressed, and the bending deformation and compressing deformation, which are allowed to a larger extent than the shearing deformation, primarily occur in the rubber members 21. Compared with the case that the input plate 14 and the mass member 11 are coupled together via the rubber members 21 deformed primarily in the shearing manner. Therefore, the stresses applied to the rubber members 21, the portion coupled to the input plate 14 and the portion coupled to the mass member 11 can be reduced without improving the quality of material of the rubber member 21 and without increasing the rigidity of the rubber member 21 (and thus without sacrificing a dampening performance).

Fifthly, the sub-clutch 13 is of the gear-meshing type which generally allows a larger torque transmission capacity than the frictional engagement type. Therefore, the sub-clutch 13 can have smaller sizes, and can be disposed in the radially inner portion of the coupling mechanism 1 so that increase in size of the coupling mechanism 1 is suppressed. Owing to employment of the synchronous block 41 in the sub-clutch 13, the teeth of the synchronous gear 31b can smoothly mesh with the teeth 14e of the input plate 14, and the damages to the synchronous gear 31b and the teeth 14e of the input plate 14 can be suppressed.

Sixthly, the sub-clutch 13 has the position correcting mechanism 32. Therefore, the engaging and disengaging operations of the sub-clutch 13 are not adversely affected by wearing of the friction facings 5a of the main clutch 3. Even when wear occurs in the friction facings 5a, the dynamic damper 10 can operate effectively to dampen the vibrations of the transmission, in the same manner as before wear of the friction facings 5a.

Seventhly, the ball bearing 6 in this coupling mechanism 1 has the outer race 6a fixed to the crankshaft 8 of the engine and the inner race 6b fixed to the input plate 14 of the dynamic damper 10. Thereby, the space radially inside the ball bearing, which is useless in the prior art, can be effectively utilized. More specifically, in this embodiment, the space radially inside the ball bearing 6 is utilized for arranging the sub-clutch 13. Since the sub-clutch 13 is arranged in the radially inner portion of the coupling mechanism 1, the size of the coupling mechanism 1 does not need to be increased.

In the dynamic damper 10 according to the present invention, shearing deformation of the rubber members 21 is suppressed. Moreover, bending or compressing deformation of the rubber members 21 in the allowed range is larger than that of the shearing deformation. Compared with the structure in which the input shaft of the transmission and the mass portion are coupled through a single annular rubber member 74 as seen in FIG. 13, the present invention reduces the stresses applied to the rubber members 21 and portions around the same without improving the quality of material of the rubber members and without increasing the rigidity of the rubber members (and thus without sacrificing a dampening performance).

While only one embodiment has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dynamic damper assembly adapted to be employed in a coupling mechanism including a main clutch coupled a crankshaft of an engine and an input shaft of a transmission, and being adapted to rotate with the input shaft of the transmission, said dynamic damper assembly comprising:

a mass portion adapted to rotate with the input shaft of the transmission;

a sub-clutch coupled to said mass portion and adapted to be coupled to the input shaft of the transmission to release the input shaft of the transmission from said mass portion when the main clutch disengages the crankshaft of the engine from the input shaft of the transmission; and an input member having an outer peripheral portion with a plurality of elastic portions arranged in a circumferential direction on said outer peripheral portion and elastically coupled to said mass portion to permit limited circular movement therebetween, and an inner peripheral portion with said sub-clutch coupled thereto, with each of said elastic portions including a rubber member, respectively, and said elastic portions elastically coupling the input shaft of the transmission and said mass portion in the rotating direction by deformation of said rubber members when the input shaft of the transmission and said mass portion are interlocked together by said sub-clutch.

2. The dynamic damper assembly according to claim 1, wherein each of said elastic portions further includes a radially inner member attached to an inner peripheral surface of said rubber member, and a radially outer member attached to the outer peripheral surface of said rubber member.

3. The dynamic damper assembly according to claim 2, wherein said radially inner members are fixedly coupled to said sub-clutch and said radially outer members are fixedly coupled to said mass portion.

4. The dynamic damper assembly according to claim 3, wherein said rubber members are substantially cylindrical members with center bores that receive said radially inner members.

5. The dynamic damper assembly according to claim 2, wherein at least some of said rubber members have at least one collapsible space located between their respective said inner peripheral surfaces and their respective said outer peripheral surfaces.

6. The dynamic damper assembly according to claim 3, wherein at least some of said rubber members have at least one collapsible space located between their respective said inner peripheral surfaces and their respective said outer peripheral surfaces.

7. A dynamic damper assembly according to claim 1, wherein said elastic portions are coupled between said sub-clutch and said mass portion.

8. A flywheel assembly comprising:

a flywheel non-rotatably coupled to a crankshaft of an engine, and disengageably coupled to a clutch disk assembly coupled to an input shaft of a transmission; and a dynamic damper assembly adapted to be employed in a coupling mechanism having a main clutch coupled between a crankshaft of an engine and an input shaft of a transmission, and being adapted to rotate with the input shaft of the transmission, said dynamic damper assembly including a mass portion adapted to rotate with the input shaft of the transmission;

a sub-clutch coupled to said mass portion and adapted to be coupled to the input shaft of the transmission to release the input shaft of the transmission from said mass portion when the main clutch disengages the crankshaft of the engine from the input shaft of the transmission; and an intput member having an outer peripheral portion with a plurality of elastic portions arranged in a circumferential direction on said outer peripheral portion and elastically coupled to said mass portion to permit limited circular movement therebetween, and an inner peripheral portion with said sub-clutch coupled thereto, with each of said elastic portions including a rubber member, respectively, and said elastic portions elastically coupling the input shaft of the transmission and said mass portion in the rotating direction by deformation of said rubber members when the input shaft of the transmission and said mass portion are interlocked together by said sub-clutch.

9. The flywheel assembly according to claim 8, further comprising a plate member having an inner peripheral portion adapted to be fixed to the crankshaft of the engine and an outer peripheral portion fixed to said flywheel, said plate having a predetermined rigidity to absorb axial vibrations.

10. A flywheel assembly according to claim 8, wherein each of said elastic portions further includes a radially inner member attached to an inner peripheral surface of said rubber member, and a radially outer member attached to the outer peripheral surface of said rubber member.

11. A flywheel assembly according to claim 10, wherein said radially inner members are fixedly coupled to said sub-clutch and said radially outer members are fixedly coupled to said mass portion.

12. A flywheel assembly according to claim 11, wherein said rubber members are substantially cylindrical members with center bores that receive said radially inner members.

13. A flywheel assembly according to claim 10, wherein at least some of said rubber members have at least one collapsible space located between their respective said inner peripheral surfaces and their respective said outer peripheral surfaces.

14. A flywheel assembly according to claim 11, wherein at least some of said rubber members have at least one collapsible space located between their respective said inner peripheral surfaces and their respective said outer peripheral surfaces.

15. A flywheel assembly according to claim 8, wherein said elastic portions are coupled between said sub-clutch and said mass portion.

* * * * *